US009376595B2

(12) United States Patent
Wang et al.

(10) Patent No.: US 9,376,595 B2
(45) Date of Patent: Jun. 28, 2016

(54) METHOD AND APPARATUS FOR FABRICATING SEPARATOR ASSEMBLY (71) Applicant: General Electric Company, Schenectady, NY (US)

(72) Inventors: Chen Wang, Shanghai (CN); Todd Alan Anderson, Niskayuna, NY (US); Su Lu, Shanghai (CN); Hua Li, Shanghai (CN); Zhen Liu, Shanghai (CN); Jie Huang, Shanghai (CN); Anubhav Kumar, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/958,062

(22) Filed: Dec. 3, 2015

(65) Prior Publication Data
US 2016/0090514 A1    Mar. 31, 2016

Related U.S. Application Data (62) Division of application No. 13/996,715, filed on Jun. 21, 2013, now Pat. No. 9,233,525.

(51) Int. Cl.
*B01D 63/10* (2006.01)
*B29C 53/56* (2006.01)
(Continued)

(52) U.S. Cl.
CPC . *C09J 5/00* (2013.01); *B01D 63/10* (2013.01); *B01D 65/003* (2013.01); *B01D 63/103* (2013.01); *B01D 2323/42* (2013.01); *B29C 53/562* (2013.01); *Y10T 156/1028* (2015.01)

(58) Field of Classification Search
CPC ............... B29C 53/562; B65H 2301/414323; B01D 63/10; B01D 63/103; B01D 65/003; B01D 2313/04

USPC ......... 156/185, 187, 188, 191, 192, 193, 194, 156/446
See application file for complete search history.

(56) References Cited

U.S. PATENT DOCUMENTS 6,068,771 A * 5/2000 McDermott ........... B01D 63/10
                                                    156/187
6,228,271 B1    5/2001 Cote
(Continued)

FOREIGN PATENT DOCUMENTS

CN    1676203 A    10/2005
JP    4917378 A    2/1974
(Continued)

OTHER PUBLICATIONS

Unofficial English translation of Japanese Office Action issued in connection with corresponding JP Application No. 2013-547502 on Nov. 17, 2015.
(Continued)

*Primary Examiner* — Carson Gross
(74) *Attorney, Agent, or Firm* — GE Global Patent Operation (57) ABSTRACT

The present invention provides a method and apparatus for fabricating a separator assembly. The method comprises: providing a central core element comprising at least one concentrate exhaust conduit and at least one permeate exhaust conduit; disposing a first portion of a membrane stack assembly comprising a permeate carrier layer, a membrane layer, and a feed carrier layer within the central core element such that the concentrate exhaust conduit and permeate exhaust conduit are separated by the first portion of the membrane stack assembly; radially winding a second portion of the membrane stack assembly around the central core element; and sealing the wound assembly comprising two opposing end surfaces made of the membrane stack assembly by applying an adhesive on both end surfaces of the wound assembly; and applying a negative pressure inside the central core element so that the adhesive penetrates into the membrane stack assembly.

8 Claims, 5 Drawing Sheets

(51) Int. Cl.
*C09J 5/00* (2006.01)
*B01D 65/00* (2006.01)

(56) References Cited

U.S. PATENT DOCUMENTS

2005/0077229 A1 4/2005 Ishii
2010/0133486 A1 6/2010 Takai et al.

FOREIGN PATENT DOCUMENTS

| | | |
|---|---|---|
| JP | 54167862 U | 11/1979 |
| JP | 2000510766 A | 8/2000 |
| JP | 2004237281 A | 8/2004 |
| TW | 200839793 A | 10/2008 |
| WO | 2007037939 A1 | 4/2007 |

OTHER PUBLICATIONS

Unofficial English translation of Taiwan Office Action issued in connection with corresponding TW Application No. 100148987 on Dec. 23, 2015.

* cited by examiner

METHOD AND APPARATUS FOR FABRICATING SEPARATOR ASSEMBLY

CROSS-REFERENCE TO RELATED APPLICATIONS

This application is a divisional of U.S. patent application Ser. No. 13/996,715, filed on Jun. 21, 2013, which is a National Stage Entry of PCT Application No. PCT/US2011/063704, filed on Dec. 7, 2011, which claims foreign priority benefit to Chinese Application No. 201010615244.2, filed on Dec. 30, 2010, all of which are incorporated by reference herein in their entireties.

BACKGROUND

This disclosure includes embodiments that generally relate to fabricating separator assemblies. In various embodiments, the disclosure relates to a method of fabricating separator assemblies. The disclosure also relates to apparatus for fabricating separator assemblies.

A conventional separator assembly typically comprises a multilayer membrane assembly disposed around a porous exhaust conduit. The multilayer membrane assembly comprises a feed carrier layer, a permeate carrier layer and a membrane layer between the feed carrier layer and the permeate carrier layer. The permeate carrier layer is in contact with the porous exhaust conduit. It is also necessary to prevent the feed carrier layer from contacting the permeate carrier layer or the porous exhaust conduit. During a typical operation, a feed solution passes through the multilayer membrane assembly along the axis of the assembly. The feed solution is brought into contact with the feed carrier layer of the multilayer membrane assembly which transmits the feed solution to the membrane layer. The membrane layer modifies and transmits a portion of the feed solution as a permeate solution to the exhaust conduit via the permeate carrier layer. A concentrated solution is also transported out of the multilayer membrane assembly via the feed carrier layer. Separator assemblies have been used in various fluid purification processes, including reverse osmosis, ultrafiltration, and microfiltration processes.

In order to ensure isolation of the permeate carrier layer from the feed carrier layer, thus preventing the permeate solution from being contaminated by the feed solution, a folded multilayer membrane assembly is typically utilized, in which the membrane layer is folded to create a pocket-like structure which envelops the feed carrier layer. The edges of the membrane layer are also sealed by applying a sealing adhesive onto a passive surface of the membrane layer in contact with the permeate carrier layer. During fabrication of separator assemblies comprising the conventional folded multilayer membrane assemblies, the sealing adhesive is often applied before the membrane stack is wound onto the exhaust conduit. The sealant is kept in an uncured state to allow the surfaces of layers of the membrane stack assembly some freedom of motion during the winding process. Therefore such folded multilayer membrane assemblies are especially susceptible to telescoping of the layered structure and consequent contamination of the permeate carrier layer. In addition, the adhesive is typically applied manually, thus it is a time-consuming process which may occupy up to 50% of overall operation time for fabricating separator assembly.

Thus, there exists a need for further improvements in both the design and manufacture of separator assemblies.

BRIEF DESCRIPTION

In one embodiment, the present invention provides a method of fabricating a separator assembly. The method may comprise following steps of: providing a central core element comprising at least one concentrate exhaust conduit and at least one permeate exhaust conduit; providing a membrane stack assembly comprising at least one permeate carrier layer, at least one membrane layer, and at least one feed carrier layer; disposing a first portion of the membrane stack assembly within the central core element such that the concentrate exhaust conduit and permeate exhaust conduit are separated by the first portion of the membrane stack assembly; radially winding a second portion of the membrane stack assembly around the central core element, wherein the feed carrier layer is in contact with the concentrate exhaust conduit and not in contact with the permeate exhaust conduit, the permeate carrier layer is in contact with the permeate exhaust conduit and not in contact with the concentrate exhaust conduit, and the permeate carrier layer does not form an outer surface of the separator assembly; and sealing a resultant wound assembly comprising two opposing end surfaces made of the membrane stack assembly to provide the separator assembly. The step of sealing the resultant wound assembly may comprise steps of applying an adhesive on both end surfaces of the wound assembly; and applying a negative pressure through at least one of the permeate exhaust conduit and the concentrate exhaust conduit so that the adhesive applied on the end surfaces of the wound assembly penetrates into the membrane stack assembly.

In further developments, the step of applying the adhesive on both end surfaces of the wound assembly may comprise a step of applying the adhesive across the end surfaces of the wound assembly while rotating the wound assembly. During the step of applying the adhesive across the end surfaces, the wound assembly may be vertically positioned. The adhesive may be applied by a method comprising brushing, painting or spaying. The negative pressure is a pressure less than ambient pressure of the wound assembly. The negative pressure may be applied by a vacuum pump connected to at least one of the permeate exhaust conduit and the concentrate exhaust conduit. The negative pressure may be applied only through the permeate exhaust conduit. The step of sealing the resultant wound assembly may further comprise a step of curing the adhesive after the adhesive is penetrated into the membrane stack assembly. The step of curing the adhesive may comprise horizontally positioning the wound assembly while rotating the wound assembly without applying the negative pressure. The method may further comprise at least one repairing step after the step of curing the adhesive. The repairing step may comprise steps of: examining whether the sealing is complete by applying a negative pressure through at least one of the permeate exhaust conduit and the concentrate exhaust conduit and observing the pressure level; and repeating the steps of applying the adhesive and the negative pressure if the sealing is not complete. The method may also comprise a step of trimming the wound assembly in appropriate size before sealing the wound assembly.

In another embodiment, the present invention provides an apparatus for sealing a separator assembly. The apparatus may comprise: a base member; a vertical column coupled to the base member; a holding device installed on the column by a horizontally positioned rotating shaft; and a vacuum pump. The holding device rotates freely about the rotating shaft, the holding device may comprise: a mounting frame comprising a middle section connected to the rotating shaft, a first section and a second section connected to the middle section and opposed to each other; and at least one pair of adaptors disposed on the first and the second section of the mounting frame, respectively. The first adaptor of the at least one pair of adaptors disposed on the first section is opposed and aligned to the second adaptor of the at least one pair of adaptors disposed on the second section. The first adaptor and the second adaptor are rotatable about an axis connecting therebetween and the separator assembly is mounted between the first adaptor and the second adaptor. The vacuum pump is connected to at least one of the first adaptor and the second adaptor.

In further developments, the separator assembly may comprise a central core element comprising a first end and a second end with O-rings installed thereon respectively. The first end of the central core element is connected to the first adaptor and the second end of the central core element is connected to the second adaptor. Each of the first and the second adaptors may comprise tubular structure having a central cavity for receiving the first end and the second end of the central core element, respectively. Each of the first and the second adaptors may comprise grooves on the cavity surface of the tubular structure for engaging with the O-rings installed on the first end and the second end of the central core element respectively. The vacuum pump may be connected to the cavity of at least one of the first and second adaptors. At least one of the first adaptor and the second adaptor may be rotated by a motor. The middle section of the mounting frame may be adjustable in length. The middle section, the first section and the second section of the mounting frame may be integrally formed.

These and other features, aspects, and advantages of the present invention may be understood more readily by reference to the following detailed description.

BRIEF DESCRIPTION OF THE DRAWINGS

Various features, aspects, and advantages of the present invention will become better understood when the following detailed description is read with reference to the accompanying drawings in which like characters may represent like parts throughout the drawings.

DETAILED DESCRIPTION

In the following specification and the claims, reference will be made to a number of terms, which shall be defined to have the following meanings.

The singular forms "a", "an", and "the" include plural referents unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Figure 1:
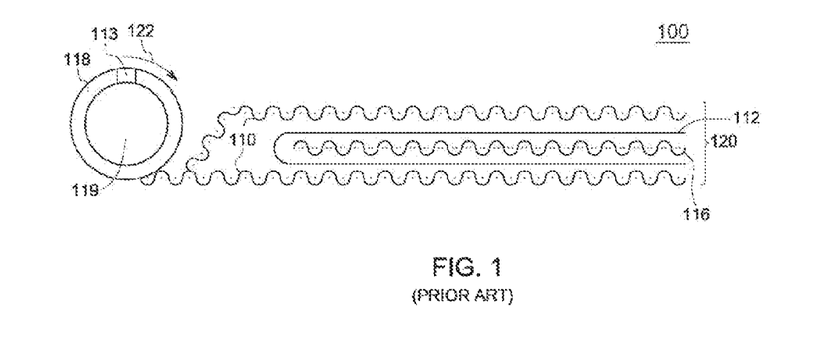
FIG. 1 is a schematic sectional view illustrating a component and a fabricating method for a conventional separator assembly.

FIG. 1 illustrates the components of and method of preparing a conventional separator assembly 100. In the conventional separator assembly 100, a membrane stack assembly 120 comprises a folded membrane layer 112 wherein a feed carrier layer 116 is sandwiched between the two halves of the folded membrane layer 112. The folded membrane layer 112 is disposed such that an active surface (not shown) of the folded membrane layer 112 is in contact with the feed carrier layer 116. The folded membrane layer 112 is enveloped by permeate carrier layers 110 such that the passive surface (not shown) of the membrane layer 112 is in contact with the permeate carrier layers 110. The membrane stack assembly 120 is wound around the permeate exhaust conduit 118, for example by rotating the permeate exhaust conduit 118 in direction 122, with the permeate carrier layer 110 in contact with the permeate exhaust conduit 118. The permeate exhaust conduit 118 comprises openings 113 to permit fluid communication with the permeate carrier layer 110. Typically, an adhesive sealant (not shown) is applied to the edges of the membrane assembly 120 before the membrane assembly is wound onto the permeate exhaust conduit. The sealant is kept in an uncured state to allow the surfaces of layers of the membrane stack assembly some freedom of motion during the winding process. Then the adhesive sealant is cured in order to isolate the feed carrier layer from the permeate carrier layer and prevent direct contact between a feed solution (not shown) and the permeate carrier layer after the adhesive sealant is cured.

Figure 2:
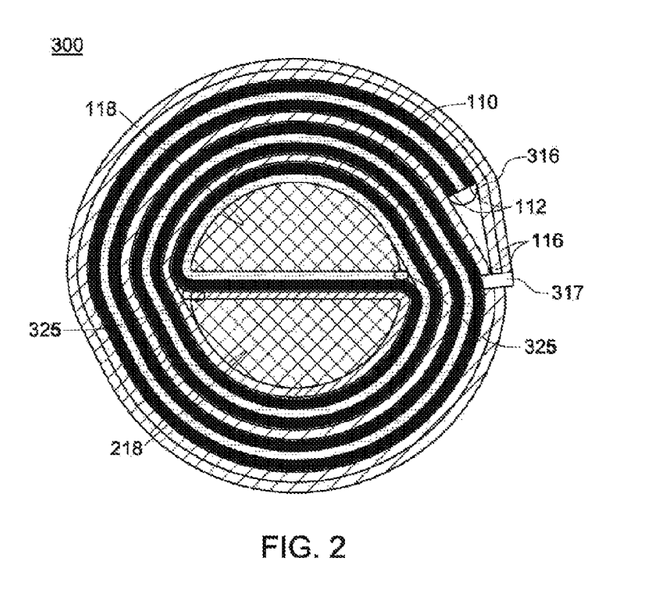
FIG. 2 is a schematic sectional view illustrating a separator assembly according to one embodiment of the present invention.

FIG. 2 illustrates a cross-section view of a separator assembly 300 according to one embodiment of the present invention. Separator assembly 300 comprises a central core element comprising a permeate exhaust conduit 118 and a concentrate exhaust conduit 218, each with openings for directing respective solution. Separator assembly 300 comprises a membrane stack assembly comprising a feed carrier layer 116, a permeate carrier layer 110, and a membrane layer 112. The membrane layer 112 is disposed between the feed carrier layer 116 and the permeate carrier layer 110. The permeate exhaust conduit 118 and the concentrate exhaust conduit 218 of the central core element are separated by a first portion of the membrane stack assembly. A second portion of the membrane stack assembly forms a multilayer membrane assembly wound around the central core element. As shown in FIG. 2, the feed carrier layer 116 is not in contact with the permeate exhaust conduit 118 or the permeate carrier layer 110, and the permeate carrier layer 110 is not in contact with the concentrate exhaust conduit 218 or the feed carrier layer 116. The outer surface of the separator assembly 300 illustrated in FIG. 2 is comprised exclusively of the feed carrier layer 116 which envelops the underlying wound structure. During operation of the separator assembly 300, the feed solution is transmitted radially through the membrane assembly, with the permeate solution and the concentrate solution passing into the permeate exhaust conduit 118 and the concentrate exhaust conduit 218, respectively. More details and variation of the separator assembly is disclosed in U.S. Patent Application No. 2010/0096319, the content of which is incorporated therein by reference in its entirety.

As shown in FIG. 2, the ends of membrane stack assembly are secured with a sealing portion 316. The sealing portion 316 is a transverse line of sealant extending along the axial direction of the separator assembly 300 and seals the outermost permeate carrier layer to the two adjacent membrane layers 112. Adhesive lines 325 are also used to secure the innermost ends of the permeate carrier layer 110 and the feed carrier layer 116 to the permeate exhaust conduit 118 and concentrate exhaust conduit 218 respectively. Furthermore, portion 317 is used to secure the feed carrier layer 116 on the outer surface of the separator assembly 300 along the axial direction. The sealant (not shown) is also applied to two opposing end surfaces of the membrane stack assembly in order to completely seal both end surfaces of the membrane stack assembly. Any gaps present within the separator assembly 300 may be eliminated by filling the gap with gap sealant. Gap sealants include curable sealants, adhesive sealants, and the like.

Figure 3:
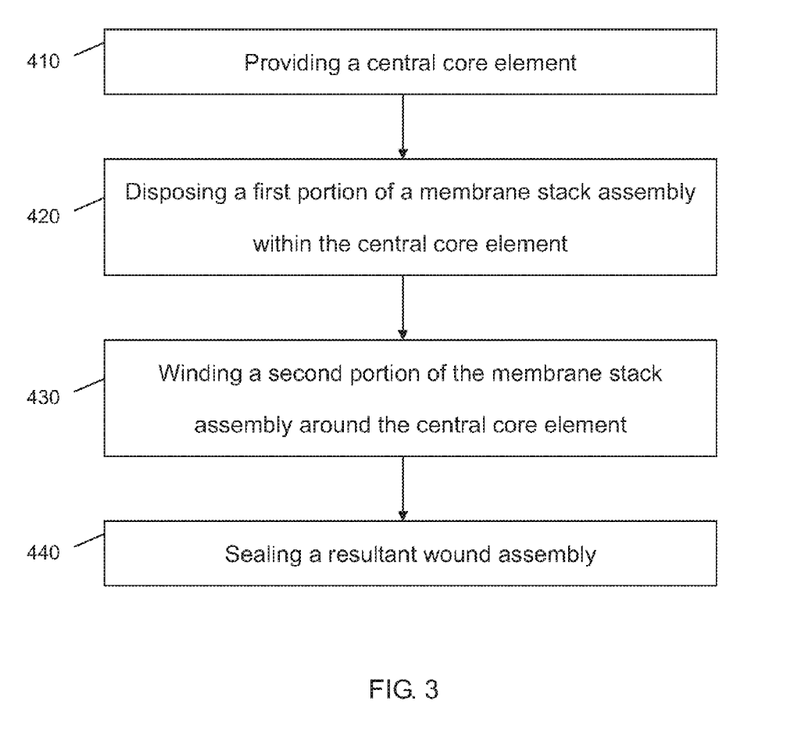
FIG. 3 is a flow chart illustrating a method in accordance with an embodiment of the present invention for fabricating the separator assembly shown in FIG. 2.

FIG. 3 is a flow chart illustrating a method in accordance with an embodiment of the present invention for fabricating the separator assembly 300 shown in FIG. 2.

Figure 4A:
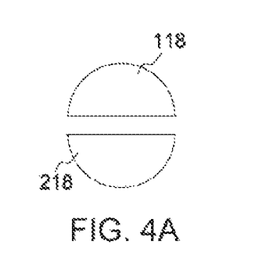
FIG. 4A-4C are schematic sectional views illustrating the method shown in FIG. 3.

In a first step 410, a central core element comprising a concentrate exhaust conduit 218 and a permeate exhaust conduit 118 is provided, as illustrated in FIG. 4A. The description of the central core element in more detail will be omitted herein to avoid redundancy.

Figure 4B:
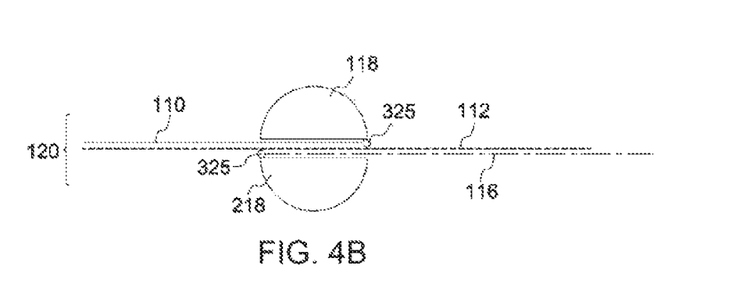

In a second step 420, an adhesive line 325 running in the longitudinal direction of the concentrate exhaust conduit 218 may be applied to fix one end of the feed carrier layer 116 on the outer surface of the concentrate exhaust conduit 218. Another adhesive line 325 running in the longitudinal direction of the permeate exhaust conduit 118 may also be applied to fix one end of the permeate carrier layer 110 on the outer surface of the permeate exhaust conduit 118. The adhesive lines 325 can be formed of a bead line of glue or double side adhesive tape, for example. Then a membrane layer 112 is placed in contact with the permeate carrier layer 110 and the feed carrier layer 116. The membrane layer 112 is positioned such that the membrane layer 112 is bisected by the central core element comprised of the concentrate exhaust conduit 218 and the permeate exhaust conduit 118. A membrane stack assembly including a membrane layer 112 disposed between a feed carrier layer 116 and a permeate carrier layer 110 comprises a first portion disposed within the central core element and a second portion disposed outside of the central core element. The resultant structure is illustrated in FIG. 4B.

Figure 4C:
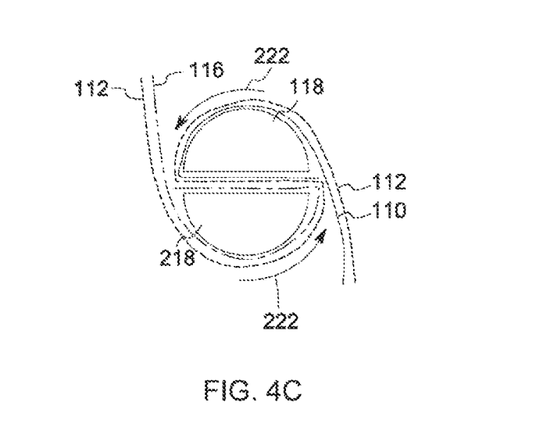

In a third step 430, the second portion of the membrane stack assembly is wound around the central core element radially by rotating the central core element in a direction 222 to form the wound assembly, for example. The length of the feed carrier layer 116 is sufficiently long so that it envelops the underlying wound assembly and comprises entire outer surface of the separator assembly. The outer surface herein refers to the outer surface of the separator assembly along the axial direction. The resultant structure is illustrated in FIG. 4C.

In a fourth step 440, the wound assembly is sealed. In particular, the ends of the membrane stack assembly present in the wound structure may be sealed by a sealing portion 316 as shown in FIG. 2. The sealing portion 316 can be implemented by various means such as curable adhesives, curable glues, double sided tapes and the like.

In order to completely seal both end surfaces of the wound membrane stack assembly, an adhesive may be applied on both end surfaces of the wound assembly. The adhesive may comprise epoxy resin. The adhesive may be applied by a suitable method such as brushing, spraying or painting, either manually or by means of a dispenser. The wound assembly may also be rotated while applying the adhesive so that the adhesive is distributed uniformly across the end surfaces of the assembly. For example, the wound assembly may be vertically positioned and rotated with a speed of about 30 rpm while applying the adhesive on one end surface facing upward. Then the wound assembly is turned over and rotated in the same speed in order to apply the adhesive on the opposing end surface of the assembly.

A negative pressure is then applied through at least one of the permeate exhaust conduit and the concentrate exhaust conduit of the central core element, for example by a vacuum pump connected to at least one of the permeate exhaust conduit and the concentrate exhaust conduit. The negative pressure is a pressure inside the assembly smaller than ambient pressure of the assembly, which is normally at an atmosphere pressure in the above process. For example, the negative pressure can range from about 0.08 to about 0.1 MPa. The negative pressure may be applied for a period of time such as about 5 minutes, so that the adhesive applied on the end surfaces of the wound assembly is drawn inwardly by a force caused by pressure difference between the negative pressure inside the assembly and a normal ambient pressure outside the assembly, and penetrates into the membrane stack assembly between layers of the assembly at a certain depth. Then the adhesive is cured. The curing process can be facilitated thermally at an elevated temperature or by applying an UV radiation. In this case, after the adhesive is cured, the sealing portion formed at the end surfaces of the wound assembly has a sufficient width to reliably seal the assembly. Since the negative pressure is substantially uniform across the end surfaces of the assembly, the penetration depths of the adhesive and thus the width of the sealing portions at both end surfaces of the assembly are also relatively uniform. This may be further facilitated by horizontally positioning the wound assembly and rotating the assembly during the curing process. In order to keep the negative pressure inside the assembly, the outer surface of the wound assembly along the axial direction might be sealed, for example by applying a sealing adhesive on the outer surface.

In the description above, the negative pressure may be applied through both the permeate exhaust conduit and the concentrate exhaust conduit. Alternatively, the negative pressure may be applied exclusively through the permeate exhaust conduit, since the sealing portion subsequently formed between the permeate carrier layer and the membrane layer may be more reliable in order to prevent the permeate solution from being contaminated by the feed solution.

In some embodiments, the steps of applying adhesive and applying negative pressure may be repeated for several times in order to improve reliability of the sealing portion.

Furthermore, the method according to the present invention may comprise an additional repairing step after the adhesive is cured in order to further improve reliability of the separator assembly. For example, the repairing step may comprise applying a negative pressure to the assembly via at least one of the permeate exhaust conduit and the concentrate exhaust conduit of the central core element by a vacuum pump after sealing of the separator assembly. The sealing of the separator assembly is determined as complete if the pressure level can be kept stable after the vacuum pump is in operation for a period of time; otherwise, the assembly can be repaired by additional steps of applying adhesive and applying negative pressure as described above.

The method according to the present invention may further comprise a step of trimming the wound assembly in appropriate size, especially in length before sealing the assembly to cut out excessive part.

In a conventional method of preparing a separator assembly, the sealant is applied to the layers of the membrane stack assembly and kept in an uncured state before winding, thus making it difficult to wind the membrane stack assembly onto the central core element without any telescoping or draping of the membrane stack assembly even if the winding process is slowly and carefully performed. In addition, conventional fabricating methods of separator assembly may increase the risk of leakage if a trimming process is performed after the winding. In comparison, the method according to the present invention can improve the efficiency and reliability of the fabricating process by winding and/or trimming the membrane stack assembly before applying the adhesive sealant and subsequent sealing the assembly. Furthermore, the adhesive can be distributed more efficiently and uniformly across the end surfaces of the membrane stack assembly utilizing pressure difference due to the negative pressure applied via the central core element. In addition, since the uncured adhesive is not subjected to a slow winding process in the method according to the present invention, faster curing adhesives can be used, thereby decreasing manufacturing time and cost.

The method of the present invention is discussed in yet greater below detail with reference to the description of an apparatus for fabricating the separator assembly according to the present invention.

Figure 5A:
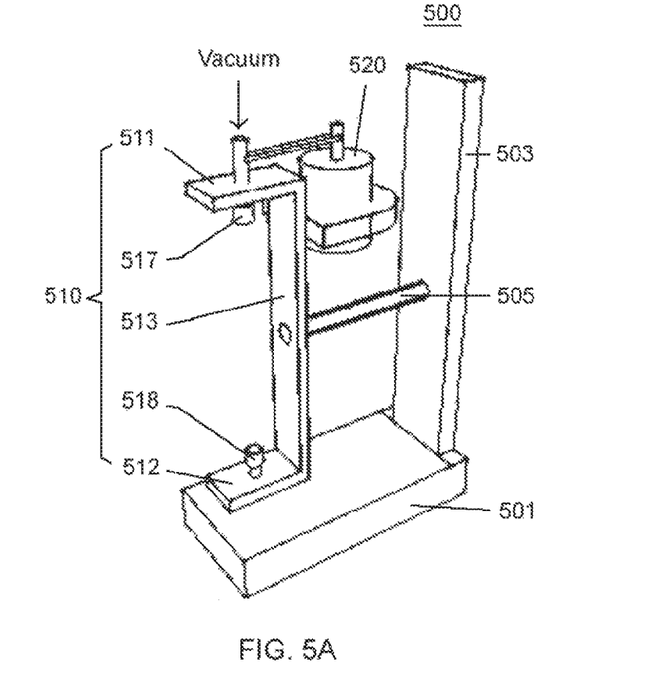
FIGS. 5A and 5B are schematic perspective views illustrating an apparatus for fabricating the separator assembly and a separator assembly in accordance with an embodiment of the present invention.

FIG. 5A illustrates a schematic, perspective view of an apparatus 500 for fabricating a separator assembly according to one embodiment of the present invention. As shown in FIG. 5A, the apparatus 500 comprises a base member 501 and a vertical column 503 coupled to the base member 501. A holding device 510 for holding the separator assembly is installed on the column 503 via a horizontally positioned rotating shaft 505. The holding device 510 may rotate freely about the rotating shaft 505. The base member 501 and the vertical column 503 provide structural support for the holding device 510.

The holding device 510 comprises a mounting frame comprising a first section 511, a second section 512 and a middle section 513. The middle section 513 is connected to the rotating shaft 505. The first section 511 and the second section 512 are connected to the middle section 513 and opposed to each other. The middle section 513, the first and the second section 511 and 512 can be formed integrally as one piece. For example, the mounting frame may be formed as shown in FIG. 5A. The mounting frame may take alternative forms as well. For example, the mounting frame may have a different overall shape such as an arc shape. In addition, the middle section 513 of the mounting frame may be adjustable in length such as using a sliding rail, so that the apparatus 500 can adapt to separator assemblies of different sizes.

The holding device 510 further comprises at least one pair of adaptors disposed on the first and second section 511 and 512 of the mounting frame, respectively. As shown in FIG. 5A, a first adaptor 517 and a second adaptor 518 are disposed on the first and second sections 511 and 512, respectively. The first adaptor 517 on the first section 511 is opposed to and aligned with the second adaptor 518 on the second section 512, such that the separator assembly can be mounted between the first and second adaptors 517 and 518. There may be a plurality pairs of adaptors separately disposed on the mounting frame so that the apparatus may process a plurality of separator assemblies simultaneously.

Figure 5B:
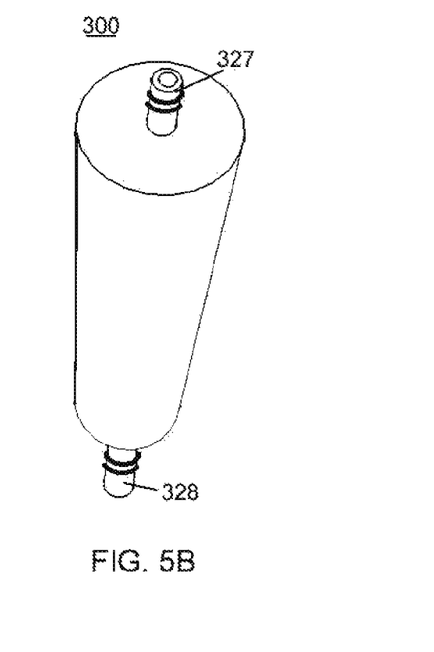

As shown in FIG. 5B, the separator assembly 300 to be mounted on the holding device 510 as described above with reference to FIG. 2 comprises a central core element and a membrane stack assembly wound around the central core element. The central core element has a first end 327 and a second end 328 with O rings installed thereon. The end surfaces of the membrane stack assembly will be sealed utilizing the apparatus 500 according to the method as described above.

As shown in FIG. 5A, both the first adaptor 517 and the second adaptor 518 have tubular structure for receiving the first end 327 and the second end 328 of the separator assembly 300, respectively. Each tubular structure comprises a central cavity connected to the permeate exhaust conduit and/or the concentrate exhaust conduit of the central core element. The cavity may also include grooves (not shown) for engaging with O rings installed on the ends of the central core element so that hermetically sealed connections may be formed when the separator assembly is mounted between two adaptors. The first and second adaptors 517 and 518 are rotatable about an axis connecting therebetween, so that the mounted separator assembly 300 can be rotated about the axis. At least one of the first and second adaptors 517 and 518 can be rotated by a motor. As shown in FIG. 5A, for example, the first adaptor 517 is rotated by a motor 520 connected to the first adaptor 517 via a belt. The motor 520 can be installed directly on the mounting frame or other suitable positions.

The apparatus 500 may also comprise a vacuum pump (not shown) connected to at least one of the first adaptor 517 and the second adaptor 518, in particular, the central cavity of the first adaptor 517 and the second adaptor 518. As shown in FIG. 5A, for example, the central cavity of the first adaptor 517 is connected to the vacuum pump. In this way, a negative pressure can be applied to the separator assembly 300 via the central cavity of the adaptors and the central core element of the assembly by the vacuum pump. A wide variety of vacuum pumps which are available commercially, are suitable for use in the context of the present invention, and are known those of ordinary skill in the art.

The step of sealing the end surfaces of the separator assembly 300 is further discussed below using the apparatus 500.

Figure 6A:
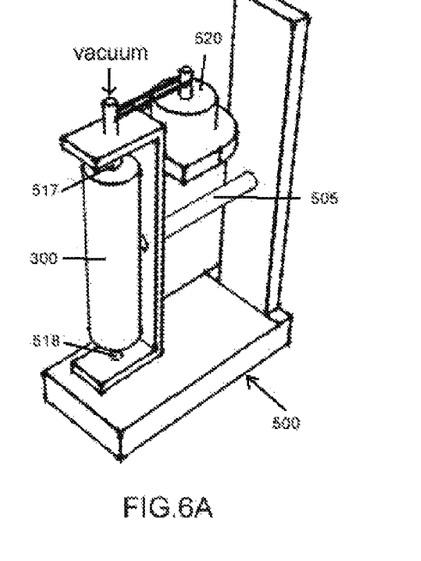
FIGS. 6A and 6B are schematic perspective views illustrating the apparatus with separator assembly installed thereon.

First, the separator assembly 300 to be sealed is mounted between the first and second adaptors 517 and 518. The assembly 300 is vertically positioned by rotating the shaft 505, as shown in FIG. 6A. Next, an adhesive is applied on one end surface of the assembly 300 while rotating the assembly via two adaptors driven by the motor 520, so that the adhesive can be distributed uniformly across the end surface. Then, the assembly 300 is turned over to apply the adhesive to the other end surface of the assembly in the same manner.

Figure 6B:
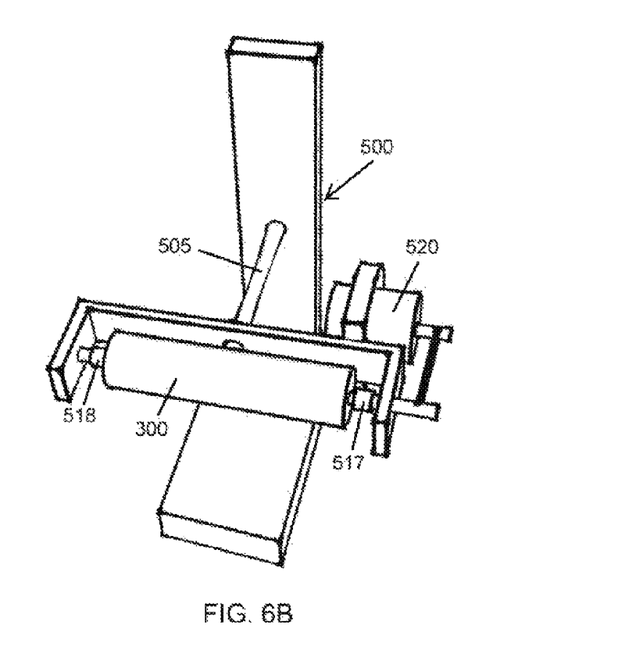

Next, the separator assembly 300 is horizontally positioned by rotating the shaft 505, as shown in FIG. 6B. The vacuum pump is then turned on for a period of time such as about 5 minutes to apply a negative pressure to the assembly so that the adhesive on both end surfaces is drawn into the assembly 300. Then the vacuum pump is turned off. In one embodiment, the assembly 300 is left on the apparatus 500 to cure the adhesive while being rotated via two adaptors driven by the motor 520. The curing process can be facilitated thermally at an elevated temperature or by applying an UV radiation.

The repairing step according to the present invention described above may be also carried out using the apparatus 500.

In view of the above, the method and apparatus for fabricating the separator assembly according to embodiments of the present invention can improve the efficiency and reliability of the fabricating process by winding and/or trimming the membrane stack assembly before applying the adhesive sealant and subsequent sealing the assembly. Furthermore, the adhesive can be distributed more efficiently and uniformly across the end surfaces of the membrane stack assembly, utilizing pressure difference due to the negative pressure applied via the central core element. In addition, the faster curing adhesive can be used to further improve manufacturing time and cost.

The foregoing examples are merely illustrative, serving to illustrate only some of the features of the disclosure. The appended claims are intended to claim as broadly as it has been conceived and the examples herein presented are illustrative of selected embodiments from a manifold of all possible embodiments. Accordingly, it is applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. An apparatus for sealing a separator assembly comprising:
    a base member;
    a vertical column coupled to the base member;
    a holding device installed on the column by a horizontally positioned rotating shaft, wherein the holding device rotates freely about the rotating shaft, the holding device comprises:
        a mounting frame comprising a middle section connected to the rotating shaft, a first section and a second section connected to the middle section and opposed to each other; and
        at least one pair of adaptors disposed on the first and the second section of the mounting frame, respectively, wherein the first adaptor of the at least one pair of adaptors disposed on the first section is opposed to and aligned with the second adaptor of the at least one pair of adaptors disposed on the second section, the first adaptor and the second adaptor are rotatable about an axis connecting therebetween and the separator assembly is mounted between the first adaptor and the second adaptor; and
    a vacuum pump connected to at least one of the first adaptor and the second adaptor.

2. The apparatus of claim 1, wherein the separator assembly comprises a central core element comprising a first end and a second end with O-rings installed thereon respectively, and the first end of the central core element is connected to the first adaptor and the second end of the central core element is connected to the second adaptor.

3. The apparatus of claim 2, wherein each of the first and the second adaptors comprises tubular structure having a central cavity for receiving the first end and the second end of the central core element, respectively.

4. The apparatus of claim 3, wherein each of the first and the second adaptors comprises grooves on the cavity surface of the tubular structure for engaging with the O rings installed on the first end and the second end of the central core element respectively.

5. The apparatus of claim 3, wherein the vacuum pump is connected to the cavity of at least one of the first and second adaptors.

6. The apparatus of claim 1, wherein at least one of the first adaptor and the second adaptor is rotated by a motor.

7. The apparatus of claim 1, wherein the middle section of the mounting frame is adjustable in length.

8. The apparatus of claim 1, wherein the middle section, the first section and the second section of the mounting frame is integrally formed.

* * * * *